United States Patent [19]
Murayama et al.

[11] 3,956,424
[45] May 11, 1976

[54] PHOTO-DEGRADABLE RESIN COMPOSITION

[75] Inventors: Naohiro Murayama; Takayuki Katto; Yo Iizuka; Teruo Sakagami, all of Iwaki, Japan

[73] Assignee: Kureha Kagaku Kogyo Kabushiki Kaisha, Tokyo, Japan

[22] Filed: Dec. 28, 1973

[21] Appl. No.: 429,636

[30] Foreign Application Priority Data
Dec. 29, 1972 Japan.................................. 48-3597
Feb. 22, 1973 Japan................................ 48-21499
June 27, 1973 Japan................................ 48-72679

[52] U.S. Cl. ........................ 260/876 R; 260/880 R; 260/DIG. 43
[51] Int. Cl.² ......................................... C08L 51/00
[58] Field of Search ................ 260/876 R, DIG. 43, 260/880

[56] References Cited
UNITED STATES PATENTS
3,798,187  3/1974  Miyoshi et al. ............. 260/DIG. 43
3,842,144  10/1974  Tanaka et al. .................. 260/876 R
3,860,538  1/1975  Guillet et al. ...................... 260/63 R OTHER PUBLICATIONS
U.S. Published Patent Application B213,211; Miyoshi et al.; publ. 1/28/75; filed 12/28/71.

Primary Examiner—Eugene C. Rzucidlo
Attorney, Agent, or Firm—Stewart and Kolasch, Ltd.

[57] ABSTRACT

A photo-degradable synthetic resin composition which consists of a blend of a butadiene-containing graft copolymer and a thermoplastic resin. The blend consists essentially of (A) 50–99 parts by weight of a graft copolymer containing at least 30% by weight of butadiene monomer, said copolymer being composed of 40–80 parts by weight of butadiene or a copolymer thereof, 60–20 parts by weight of styrene, methyl methacrylate or a mixture thereof and 0.01–5 parts by weight of a cross-linking agent copolymerizable therewith, and (B) 1–50 parts by weight of polystyrene, polymethyl methacrylate, polyacrylonitrile, polyvinyl chloride, polyvinylidene chloride or copolymers thereof.

8 Claims, No Drawings

PHOTO-DEGRADABLE RESIN COMPOSITION

BACKGROUND OF THE INVENTION

This invention relates to a photo-degradable resin composition which becomes rapidly aged and brittle due to direct irradiation of the sun light or ultra-violet rays, resulting in easy breakage owing to the weathering effect, or even by a slight artificial or mechanical shock from outside.

With increase in consumption of plastic wrapping materials, one-way containers, and so forth, these plastic wastes have brought about serious social problems as one of the undesirable causes of environmental pollution.

One method of solving such problem is to use containers or wrapping materials made of a resin composition having a photo-degrading property which causes the used containers, etc., when they are left outdoors, to be degraded by deterioration and enbrittlement due to the direct sun light, ultra-violet rays, or weathering effect.

The photo-degradable resin composition to be used for this purpose should be one that, when left outdoors, it is prone to be deteriorated or aged by light irradiation, and, at the same time, it still possesses sufficient mechanical strength required of the plastic material during the period of use.

There has been used, for a variety of purposes, the so-called graft copolymer (hereinafter referred to as butadiene type graft copolymer) produced by graft-polymerizing one or more kinds of vinylidene type monomer upon a butadiene polymer rubber or a copolymer of butadiene, as a principal component, and another monomer copolymeriazble therewith, either alone or as a blend with other plastic components.

This type of graft copolymer, or a resin composition containing therein such graft copolymer as the major constituent, for use in manufacturing shaped articles usually contains therein 20% by weight or so of the butadiene component, and the graft copolymer containing therein more than 30% by weight of butadiene has been especially used as an impact modifier to be blended with other plastic components in a major quantity.

In using the butadiene type graft copolymer as the impact modifier, the weather resistance thereof has been the problem, and there has been frequently practised addition of a stabilizer to this graft copolymer to prevent the shaped articles made thereof from becoming aged and brittle. In spite of such fact, however, there has been made not a single proposal to use this butadiene type graft copolymer as a blending component for the photo-degradable resin material.

The present inventors have recognized that a graft copolymer containing therein at least 30% by weight of butadiene, in terms of its monomer unit, which is obtained by graft-polymerizing at least one kind of vinylidene type monomer with a rubber polymer selected from butadiene polymer, or copolymers containing therein butadiene as the principal constituent is particularly remarkable in its aging due to the light irradiation. As the result of further studies and researches on improvement in the photo-degrading property thereof, they have found that the copolymer having a cross-linked graft portion (plastic component) by addition of a small amount of a cross-linking agent at the time of graft-polymerization of the vinylidene type monomer is exceedingly superior in its photo-degrading property as compared with a copolymer having a non-cross-linked graft portion.

SUMMARY OF THE INVENTION

It is therefore the primary object of the present invention to provide a resin composition having sufficient photo-degrading property which is practically useful as containers and wrapping materials, and which, after use, is easily degraded by the weathering effect such as by direct irradiation of the sun light, etc.

According to the present invention, there is provided a photo-degradable resin composition which consists of: 50 to 99 parts by weight of a graft copolymer containing at least 30% by weight of butadiene, in terms of its monomer unit, said graft copolymer being produced by graft-polymerizing, in one or more divided stages, 20 to 60 parts by weight of a monomer selected from styrene, methyl methacrylate, or a mixture of styrene and methyl methacrylate, and 0.01 to 5 parts by weight of a cross-linking agent upon 40 to 80 parts by weight of a homopolymer of butadiene, or a copolymer of butadiene as a principal constituent, and a monomer copolymerizable therewith; and 50 to 1 part by weight of a homopolymer of styrene, methyl methacrylate, acrylonitrile, vinyl chloride, or vinylidene chloride, or a copolymer of said monomers as the principal constituent and other monomers copolymerizable therewith.

The foregoing objects of the present invention and the details thereof will become more apparent from the following description in conjunction with several preferred embodiments thereof.

DETAILED DESCRIPTION OF THE INVENTION

The first characteristic feature of the present invention is that, by blending the butadiene-containing graft copolymer with a thermoplastic resin, processability of the butadiene-containing graft copolymer can be improved, and hence the resin composition of excellent processability can be derived from the blending, which enables shaped articles of any desired configuration to be produced easily. For example, the butadiene-containing graft copolymer alone is difficult to be formed into a sheet of uniform thickness by melt-extrusion method. However, by the blending an appropriate thermoplastic resin with the butadiene-containing graft copolymer, it becomes possible to obtain a sheet of uniform thickness by the melt-extrusion. Also, only with a butadiene-containing graft copolymer having a cross-linked graft portion, vacuum-molding of the resin material is impossible, but, blending of an appropriate thermoplastic resin therewith facilitates the vacuum-molding.

The second characteristic feature of the present invention is that, by use of a graft copolymer having a cross-linked graft portion, which is produced by using a cross-linking agent copolymerizable with a monomer to be grafted upon a butadiene rubber latex, as a counterpart (butadiene-containing graft copolymer) to be blended with a thermoplastic resin for a blended resin composition to be processed into shaped articles of any desired configuration, it is possible to obtain shaped articles having a faster photo-degrading property due to the direct sun light or ultra-violet rays than that produced from a resin composition containing therein a graft-copolymer having a noncross-linked graft portion.

The third characteristic feature of the invention is that the time for the shaped articles to become brittle due to deterioration or aging of the resin composition constituting the same by the irradiation of direct sun light or ultra-violet rays can be optionally adjusted by the addition quantity of the cross-linking agent. In other words, when the cross-linking agent to be added is in large quantity, the enbrittling time of the shaped article becomes shorter than in the case where the quantity thereof is small.

Incidentally, the "enbrittling time" as used in this specification means the period of time, during which elongation of a sheet becomes almost none due to deterioration of the resin composition by the light irradiation such as direct sun light or ultra-violet rays, and, as the result, it is easily broken even by a slight bending action.

When the butadiene-containing graft copolymer and the thermoplastic resin as used in the present invention are blended at specified blending rates, it is possible to obtain shaped articles having high transparency. Moreover, the kind of thermoplastic resin, with which the butadiene-containing graft copolymer is blended, is numerous.

Furthermore, it is possible to blend two or more kinds of thermoplastic resin with the butadiene-containing graft copolymer, whereby the photo-degrading property of the blended resin composition can be adjusted. That is, the photo-degrading property varies depending on the kind of polymer to be blended with the butadiene-containing graft copolymer, and hence it is possible to adjust the photo-degrading property of the blended resin composition, for example, by selecting two kinds of resins which exhibit mutually different photo-degrading property, when blended with the butadiene-containing graft copolymer, and by varying the blending rate of these two resins with respect to the butadiene-containing graft copolymer.

In the case of high polymer shaped articles, the deterioration of which proceeds from its surface part by the actions of light and oxygen in the main, those articles having a thin thickness can be photo-degraded relatively quickly, but, when the thickness thereof exceeds a certain extent, its interior is somewhat difficult to deteriorate with the consequence that such shaped articles do not degrade for a considerable length of time. However, the shaped articles made of a resin composition of the butadiene-containing graft copolymer having a cross-linked graft portion and an appropriate thermoplastic resin as proposed in the present invention are readily degraded with even a slight external shock imparted thereto irrespective of their thickness. For instance, sample sheets of 1 mm thick have been found to be easily broken by a slight shock imparted thereto from the outside as a result of their being exposed in a weathermeter (sun shine carbon arc; black panel temperature of 63° ± 3°C; rain fall of 12 mm/60 min.) for 20 to 150 hours, at which the sheets almost lost their elongation.

The photo-degradable resin composition according to the present invention is therefore particularly useful as wrapping materials, bottles, and casing for food stuffs of oneway use by taking advantage of the above-described characteristics.

More details explanations of carrying out the present invention will follow in the subsequent paragraphs commencing from production of the butadiene-containing graft copolymer to the weathering test of the shaped articles produced from the blended resin composition according to the present invention.

1. Production of Butadiene-Containing Graft Copolymer

First of all, rubber latex or a graft copolymer of butadiene and a monomer which is copolymerizable with butadiene is produced by the known method of emulsion polymerization.

The monomer to be copolymerized with butadiene is selected from those compounds such as conjugated diene compounds, e.g., isoprene, chloroprene, etc.; aromatic vinyl compounds, e.g., styrene, alpha-methylstyrene, etc.; unsaturated nitrile compounds, e.g., acrylontrile, methacrylontrile, etc.; unsaturated acid esters, e.g., methyl acrylate, methyl methyacrylate, ethyl acrylate, etc.; divinyl compounds, e.g., divinyl benzene, etc.; and dimethacrylates, e.g., mono-ethylene glycol dimethyacrylate, polyethylene glycol dimethacrylate, polypropylene glycol dimethacrylate, etc.

In the case of the copolymerization, the quantity of butadiene should be at least 50% by weight. The most commonly adopted composition of the copolymer rubber is butadiene of 60 to 90% by weight and styrene of 40 to 10% by weight.

Subsequent to the copolymerization, a monomer such as styrene or methyl methacrylate, or a mixture of these monomers is grafted upon the resultant rubber latex in the presence of a cross-linking agent.

The graft-polymerization can be done by the emulsion-polymerization the same as in the abovementioned copolymerization of butadiene rubber. Catalyst and assistants for the polymerization which remain in the latex can be used as they are, although the same or different kinds of catalyst and assistants may further be added depending on the necessity.

For the cross-linking agent, therer is no particular restriction as to the class of the compounds, provided that they are copolymerizable with the abovementioned monomers. As examples, there are used unsaturated compounds having polyfunctional radicals such as polyalkenyl-substituted aromatic compounds, e.g., divinylbenzene, trivinylbenzene, etc.; polyunsaturated acid esters of polyhydric alcohols, e.g., mono-ethylene glycol dimethacrylate, polyethylene glycol dimethacrylate, polypropylene glycol dimethacrylate, trimethylol propane trimethacrylate, etc.; polyunsaturated alcohol esters of polybasic acids, e.g., diallyl phthalate, trivinyl cyanurate, tri-allyl cyanurate, tri-allyl isocyanurate, etc.; ethers of unsaturated alcohols, e.g., divinyl ether, vinyl acryl ether, etc.; esters of unsaturated alcohols and unsaturated acids, etc.

It is not always necessary to carry out the graft-polymerization in a single stage by adding to the rubber latex the monomeric compound and the cross-linker to be grafted thereupon at once, but the graft-polymerization can be carried out in two or more divided stages.

The quantity of the monomer for the graft-polymerization ranges from 60 to 20 parts by weight, in terms of the total quantity of the monomer to be graft-polymerized, with respect to 40 to 80 parts by weight of the rubber component in the rubber latex. Also, the quantity of the cross-linker in its total monomer quantity ranges from 0.01 to 5 parts by weight.

When the butadiene content in the graft-copolymer is reduced, the photo-degrading property of the obtained resin composition becomes poor. Accordingly, care should be taken to secure the butadiene content in the graft copolymer to be in the range of from 30% to 70% by weight.

Also, when the amount of the cross-linker increases at the time of the graft-polymerization, the photo-degrading property of the shaped articles obtained from the blended resin composition is accelerated, so that the degradation time of the shaped articles made of the resin composition can be adjusted by the amount of the cross-linking agent to be added. However, if the amount of the cross-linking agent is too large, the resulting graft copolymer becomes poor in its thermoplasticity, hence its amount should preferably be less than 5 parts by weight, or, in the range of from 0.01 to 5 parts by weight, with respect to 100 parts by weight of the monomer.

Further, in case the graft-polymerization is conducted in two stages, the amount of the cross-linker in the monomer to be added at the second stage should preferably be made large for the increased photo-degrading property of the shaped articles made of the blended resin composition.

2. Preparation of Polymer Blend

The thus obtained butadiene-containing polymer is subsequently blended with a thermoplastic resin to produce a blended resin composition having good photo-degrading property.

For the thermoplastic resin to be blended therewith, there can be used homopolymer of monomeric styrene, methyl methacrylate, acrylonitrile, vinylidene chloride, or vinyl chloride, or copolymers of these monomers and other monomers copolymerizable therewith with the former as the principal constituent.

The monomer compound as their constituent, when the copolymer is used as the blending component, may be of any kind, provided that it is copolymerizable with the monomer as the principal constituent. Examples of such monomer are: aromatic vinyl compounds such as styrene, alpha-methyl styrene, etc.; conjugated diene compounds, such as butadiene, etc,; unsaturated nitriles such as acrylonitrile, methacrylonitrile, etc.; unsaturated acid esters such as ethyl acrylate, methyl acrylate, etc.; vinyl esters such as vinyl acetate; halogen-substituted olefins such as vinylidene chloride, etc.; olefins such as ethylene, etc.; vinyl ketones; vinyl ethers; and so forth.

At the blending, the butadiene-containing graft copolymer of from 50 to 99 parts by weight is blended with a thermoplastic resin of from 50 to 1 part by weight for the intended resin composition. It is more preferable that, from the point of the increased photo-degrading property, the quantity of the butadiene-containing graft copolymer be at least 60 parts by weight.

The blending of the resin components may be done by the known expedients such as mixing of the butadiene-containing graft copolymer latex and the thermoplastic resin latex, followed by co-salting- (or aciding-) out; (2) melting and kneading by rolls of the above-mentioned resins in powder or pellet form; or (3) dry-blending of the resins in powder form.

Depending on necessity, it is also possible to add a heat-stabilizer, plasticizer, lubricant, coloring matter, antistatic agent, and other processing assistants, and fillers. The quantity of addition of the processing assistants generally ranges from 0.1 to 10 parts by weight with respect to 100 parts by weight of the resin component.

PREFERRED EMBODIMENTS

In order to enable those skilled in the art to practise the present invention most properly, the following actual examples are presented. It should however be noted that these examples are illustrative only, and they do not intend to limit the scope of the present invention. Rather, possible changes and modifications may be effected within the ambit of the invention as disclosed and claimed.

EXAMPLE 1 a. Production of Butadiene-Containing Graft Copolymer

Into a stainless steel autoclave of 10-liter capacity having an agitator, there were charged 42 parts by weight of butadiene, 10 parts by weight of styrene, 0.14 part by weight of divinyl benzene, and 200 parts by weight of water containing therein 0.9 part by weight of potassium oleate as an emulsifier, 0.11 part by weight of diisopropyl benzene hydroperoxide as a polymerization initiator, and a very small amount of redox assistants such as iron, Rongalite (a trademark of sodium formaldehyde sulfoxylate), and so on, and the emulsion-polymerization was conducted at a temperature of 45°C for 17 hours to obtain a rubber latex of butadiene-styrene copolymer.

The thus obtained copolymer rubber latex was then cooled to room temperature, into which there were added and dispersed 21 parts by weight of styrene, 11 part by weight of methyl methacrylate, 0.4 parts by weight of divinyl benzene, 0.047 part by weight of diisopropylbenzene hydroperoxide, 0.024 parts by weight of Rongalite, and 1.5 part by weight of water, and thereafter the polymerization was further conducted for 6 hours at an elevated temperature of 50°C.

The resulting polymer latex was again cooled to room temperature, whereupon 16 parts by weight of methyl methacrylate, 0.4 part by weight of divinyl benzene, 0.016 part by weight of diisopropylbenzene hydroperoxide, 0.008 parts by weight of Rongalite, and 1.5 parts by weight of water were added to the polymer latex, and the batch was polymerized for 7 hours at an elevated temperature of 50°C. The particle size of this latex was approximately 800 angstroms.

To the produced polymer latex, 1 part by weight of a phenol type stabilizer was added, and then the latex was subjected to aciding-out to finally obtain a butadiene-styrene-methyl methacrylate (MBS) graft copolymer at a yield of 98%.

For the sake of comparison, there was produced an MBS graft copolymer resin of exactly the same charging composition as mentioned above with the exception that no divinyl benzene was used in the first and second graft-polymerizations. The particle size of this MBS latex was approximately 800 angstroms. The rate of yield of the graft copolymer was 97.5%.

b. Prepareation of Polymer Blend

Each of the above two kinds of MBS graft copolymers was then blended with polyvinyl chloride having an average polymerization degree of 700 and containing therein 0.5 part by weight of di-n-octyltin mercaptide as a stabilizer at a weight ratio of 90 (MBS) : 10 (PVC) in a roll-kneader maintained at a temperature of 160°C for 3 minutes.

Each blended polymer was then molded at a temperature of 200°C under pressure into a sheet of 1 mm thick. Transparency of the sheets thus obtained was found satisfactory.

c. Weathering Test

Each of the sheets was stamped out by a dumb bell, and the sample piece thus stamped out was placed in a weathermeter (Standard Sun Shine Weathermeter, Model WE-SUN-HC, black panel temperature of 63° ± 3°C and rain-fall of 12 mm/60 min. - a product of Toyo Rika Kogyo K.K., Japan) for the accelerated weathering test.

Variations in elongation of the sample sheets due to the exposure in the weathermeter are as shown in Table 1 below. For measuring the elongation of the sample sheets, "Tensilon UTM" of Toyo Sokki K.K., Japan was used.

Table 1

| Sample No. | Blending Composition (wt. part) | Graft Portion of MBS | Exposed for: (hrs) | | | |
|---|---|---|---|---|---|---|
| | | | 0 | 20 | 60 | 130 |
| 1 (comparative sample) | MBS graft copolymer (100) | cross-linked | 80% | 0% | — | — |
| 2 | MBS graft copolymer (90) Polyvinyl chloride (10) | cross-linked | 184% | 125% | 0% | — |
| 3 (comparative sample) | MBS graft copolymer (90) Polyvinyl chloride (10) | non-cross-linked | 288% | 250% | 148% | 67% |

NOTE:
1. Stretching speed = 10 mm/min.
2. Dimension of sample sheet = 10mm (W) × 40mm (L) × 1mm (TH)
3. The elongation of "0%" denotes that the sample sheet was readily crushed by a slight bending action.

Table 2

| Sample No. | Blending Composition (wt. part) | | Elongation Before Exposure (%) | Enbrittling Time (hrs.) |
|---|---|---|---|---|
| 1 (comparative sample) | MBS | 100 | 174 | 20 |
| 2 | MBS PVC | 90 10 | 272 | 85 |
| 3 | MBS PMMA | 90 10 | 234 | 65 |
| 4 | MBS PSt | 90 10 | 141 | 20 |
| 5 | MBS PAS | 90 10 | 205 | 45 |
| 6 | MBS PAS | 70 30 | 150 | 35 |

NOTE:
1. Stretching speed = 10 mm/min.
2. Dimension of sample sheet = 10mm (W) × 40mm (L) × 0.5mm (TH)
3. "Enbrittling time" means the time, during which the sample sheet loses its elongation due to exposure thereof in the weathermeter to become easily broker even by a slight bending action.

EXAMPLE 2

The MBS graft copolymer having the cross-linked graft portion as produced in Example 1 was blended with each of the below-listed thermoplastic resins by the roll-kneader as used in the preceding Example for 3 minutes at 160°C at a blending rate by weight of 90 (MBS) : 10 (thermoplastic resin), or 70 (MBS) : 30 (thermoplastic resin).

a. polyvinyl chloride (PVC) having an average polymerization degree of 700, and containing therein 0.5 part by weight of di-n-octyltin mercaptide as a stabilizer;

b. polymethyl methacrylate (PMMA), "ACRYPET V.H. ", a product of Mitsubishi Rayon Co. Ltd., Japan;

c. polystyrene (PSt), "STYRON-666-K-27", a product of Asahi-Dow Chemical Co., Ltd., Japan;

d. acrylonitrile-styrene copolymer (PAS), "TYRILE 780", a product of Asahi-Dow Chemical Co. Ltd., Japan.

The blended resin compositions thus prepared were then press-formed into sheets of 0.5 mm thick at a temperature of 200°C. The resulting sheets were stamped out by a dumb bell for test samples which were then subjected to the accelerated weathering text by means of the weathermeter in the same manner as in Example 1. The results of the test are shown in Table 2 below.

EXAMPLE 3 a. Production of Butadiene-Containing Graft Copolymer

Into a stainless steel autoclave of 10-liter capacity having an agitator, there were charged 48 parts by weight of butadiene, 12 parts by weight of styrene, 0.6 part by weight of divinyl benzene, and 200 parts by weight of water containing therein 0.9 part by weight of potassium oleate as an emulsifier, 0.12 part by weight of diisopropyl benzene hydroperoxide as a polymerization initiator, and a very small amount of redox assistants such as iron, Rongalite (a trademark for sodium formaldehyde sulfoxylate), and so on, and the emulsion-polymerization was conducted at a temperature of 45°C for 16 hours to obtain a rubber latex of butadiene-styrene copolymer.

The thus obtained copolymer rubber latex was then cooled to room temperature, into which there were added and dispersed 20 parts by weight of styrene, 0.33 part by weight of divinyl benzene, 0.03 part by weight of diisopropylbenzene hydroperoxide, 0.014 part by weight of Rongalite, and 1.5 parts by weight of water, thereafter and the polymerization was further conducted for 7 hours at a temperature of 45°C.

The resulting polymer latex was again cooled to room temperature, whereupon 20 parts by weight of styrene, 0.33 parts by weight of divinyl benzene, 0.021 part by weight of diisopropyl benzene hydroperoxide, 0.01 part by weight of Rongalite, and 1.5 parts by weight of water were added to the polymer latex, and the batch was polymerized for 7 hours at an elevated temperature of 45°C.

To this produced copolymer latex, 1 part by weight of phenol type stabilizer was added, and then the latex was subjected to aciding-out to finally obtain a butadiene-styrene graft copolymer (BS) at there was produced a yield of 96%.

For sake of comparison, a BS graft copolymer resin of the exactly the same charging composition as mentioned above with the exception that no divinyl benzene was used in the first and second graft polymerizations. The rate of yield of the graft copolymer was 96%.

b. Preparation of Polymer Blend

The thus obtained butadiene-styrene graft copolymer (BS graft copolymer) was blended with each of polystyrene (PSt) as used in Example 2 above and polyvinyl chloride (PVC) also as used in the same Example by the roll-kneader for 3 minutes at 160°C at a blending rate by weight of 90 (BS) : 10 (PVC or PSt).

The blended resin compositions thus prepared were then press-formed into sheets of 0.5 mm thick at a temperature of 200°C.

c. Weathering Test

The press-formed sheets were then stamped out by the dumb bell, and the stamped-out test pieces were subjected to the accelerated weathering test in the weathermeter as used in Example 1.

Variations in elongation of the sample pieces due to exposure in the weathermeter are as shown in Table 3 below.

weight of water containing therein 0.9 part by weight of potassium oleate as an emulsifier, 0.12 part by weight of diisopropyl benzene hydroperoxide as a polymerization initiator, and a very small amount of redox assistants such as iron, Rongalite (a trademark for sodium formaldehyde sulfoxylate) and so on, and the emulsion-polymerization was conducted at a temperature of 45°C for 16 hours to obtain a rubber latex of butadiene-styrene copolymer.

The thus obtained copolymer rubber latex was then cooled to room temperature, into which there were added and dispersed 40 parts by weight of styrene, 0.66 part by weight of divinyl benzene, 0.06 part by weight of diisopropyl benzene hydroperoxide, 0.03 part by weight of Rongalite, and 1.5 parts by weight of water, and thereafter the polymerization was further conducted for 7 hours at a temperature of 45°C.

To this produced copolymer latex, 1 part by weight of phenol type stabilizer was added, and then the latex was subjected to aciding-out to finally obtain a butadiene-styrene graft copolymer (BS) at a yield of 97%.

b. Preparation of Polymer Blend

The thus obtained butadiene-styrene graft copolymer (BS graft copolymer) was blended with each of polystyrene (PSt), polyvinyl chloride (PVC), polymethyl methacrylate (PMMA), and acrylonitrile-styrene copolymer (PAS), all being the same as those used in Example 2, by the roll-kneader for 3 minutes at 160°C at a blending rate by weight of 90 (BS) : 10 (thermoplastics) or 70 (BS) : 30 (thermoplastics).

The blended resin compositions thus prepared were then press-formed into sheets of 0.5 mm thick at a temperature of 200°C.

Table 3

| Sample No. | Blending Composition (wt. part) | | Graft Portion of MBS | Exposed for: (hrs.) | | | | | |
|---|---|---|---|---|---|---|---|---|---|
| | | | | 0 | 23 | 48 | 64 | 76 | 93 | 191 |
| 1 | BS PVC | 90 10 | cross-linked | 55% | 58% | 25% | — | 19% | 0% | — |
| 2 | BS PSt | 90 10 | cross-linked | 112% | 5% | 0% | — | — | — | — |
| 3 (comparative sample) | BS PVC | 90 10 | non-cross-linked | 163% | — | — | 128% | — | — | 20% |
| 4 (comparative sample) | BS PSt | 90 10 | non-cross-linked | 216% | — | — | 32% | — | — | 10% |

NOTE:
1. Stretching speed = 50 mm/min.
2. Dimension of sample sheet = 10mm (W) × 40mm (L) × 0.5mm (TH)

From Table 3 above, it will be understood that the shaped articles produced from the blend of the BS graft copolymer with its graft portion being cross-linked and thermoplastic resin are faster in their deterioration in elongation than the shaped articles produced from the blend of the BS graft copolymer with its graft portion not being cross-linked and the thermoplastic resin.

EXAMPLE 4 a. Production of Butadiene-Containing Graft Copolymer

Into a stainless steel autoclave of 10-liter capacity having an agitator, there were charged 48 parts by weight of butadiene, 12 parts by weight of styrene, 0.6 part by weight of divinyl benzene, and 200 parts by c. Weathering Test

The press-formed sheets were then stamped out by the dumb bell as in Example 1, and the stamped-out sample sheets were subjected to the accelerated weathering test in the weathermeter as used in Example 1 above.

Variations in elongation of the sample sheets due to the exposure in the weathermeter are as shown in Table 4 below.

Table 4

| Sample No. | Blending Composition (wt. part) | | Exposed for: (hrs.) | | | |
|---|---|---|---|---|---|---|
| | | | 0 | 28 | 64 | 109 |
| 1 (compar- | BS | 100 | 42% | 0% | — | — |

Table 4-continued

| Sample No. | Blending Composition (wt. part) | | Exposed for: (hrs.) | | | |
|---|---|---|---|---|---|---|
| | | | 0 | 28 | 64 | 109 |
| ative sample) | | | | | | |
| 2 | BS | 90 | 43% | 0% | — | — |
| | PSt | 10 | | | | |
| 3 | BS | 70 | 19% | 0% | — | — |
| | PSt | 30 | | | | |
| 4 | BS | 70 | 40% | 10% | 0% | — |
| | PAS | 30 | | | | |
| 5 | BS | 90 | 49% | — | 16% | 0% |
| | PMMA | 10 | | | | |
| 6 | BS | 90 | 70% | — | 33% | 0% |
| | PVC | 10 | | | | |

NOTE:
1. Stretching speed = 50 mm/min.
2. Dimension of sample sheets = 10mm (W) × 40mm (L) × 0.5mm (TH)

EXAMPLE 5 a. Production of Butadiene-Containing Graft Copolymer

Into a stainless steel autoclave of 10-liter capacity having an agitator, there were charged 48 parts by weight of butadiene, 12 parts by weight of styrene, 0.2 part by weight of divinyl benzene, and 200 parts by weight of water containing therein 0.9 part by weight of potassium oleate as an emulsifier, 0.12 part by weight of diisopropyl benzene hydroperoxide, and a very small amount of redox assistants such as Rongalite (a trademark for sodium formaldehyde sulfoxylate), iron, and so forth, after which the emulsion-polymerization was conducted at a temperature of 45°C for 17 hours to obtain a rubber latex of butadiene-styrene copolymer.

The thus obtained copolymer rubber latex was then cooled to room temperature, into which there were added and dispersed 19 parts by weight of styrene, 9 parts by weight of methyl methacrylate, 0.3 part by weight of divinyl benzene, 0.04 part by weight of diisopropyl benzene hydroperoxide, 0.02 part by weight of Rongalite, and 1.5 parts by weight of water, and thereafter the polymerization was further conducted for 6 hours at an elevated temperature of 50°C.

The resulting polymer latex was again cooled to room temperature, whereupon 12 parts by weight of methyl methacrylate, 0.3 part by weight of divinyl benzene, 0.012 part by weight of diisopropyl benzene hydroperoxide, 0.006 part by weight of Rongalite, and 1.5 parts by weight of water were added to the polymer latex, and the batch was polymerized for 7 hours at an elevated temperature of 50°C. The particle size of the obtained rubber latex was approximately 800 angstroms.

To this produced copolymer latex, 1 part by weight of the phenol type stabilizer was added, and then the latex was subjected to aciding-out to finally obtain a butadiene-styrene graft copolymer (BS) at a yield of 97.5%.

b. Preparation of Polymer Blend 80 parts by weight of the thus obtained butadiene-styrene-methyl methacrylate (MBS) graft copolymer was blended with 20 parts by weight of a blended polystyrene (PSt) and polymethyl methacrylate (PMMA) as used in Example 2 by the roll-kneader for 3 minutes at 160°C. The blending quantity of PSt andd PMMA is varied such that the total quantity of both components constitutes 20 parts by weight.

The blended resin composition thus prepared was then press-formed into a sheet of 0.5 mm thick at a temperature of 200°C.

c. Weathering Test

The press-formed sheet was then stamped out by the dumb bell as in Example 1, and the stamped-out sample sheet was subjected to the accelerated weathering test in the weathermeter as used in the foregoing Examples.

Variations in elongation of the sample sheet due to the exposure thereof in the weathermeter are as shown in Table 5 below.

Table 5

| Sample No. | Blending Composition (wt. part) | | Exposed for: (hrs.) | | | | | |
|---|---|---|---|---|---|---|---|---|
| | | | 0 | 11 | 24 | 41 | 65 | 111 |
| 1 (comparative sample) | MBS | 100 | 292% (100%) | 180% (62%) | 110% (38%) | 39% (13%) | 34% (12%) | 0% |
| 2 | MBS | 80 | 304% (100%) | 214% (70%) | — | 153% (50%) | 56% (18%) | 38% (13%) |
| | PMMA | 20 | | | | | | |
| 3 | MBS | 80 | 262% (100%) | 208% (79%) | 111% (42%) | 84% (32%) | 25% (10%) | 12% (5%) |
| | PMMA | 15 | | | | | | |
| | PSt | 5 | | | | | | |
| 4 | MBS | 80 | 292% (100%) | — | 42% (14%) | 0% | — | — |
| | PMMA | 10 | | | | | | |
| | PSt | 10 | | | | | | |
| 5 | MBS | 80 | 258% (100%) | 116% (45%) | 0% | — | — | — |
| | PMMA | 5 | | | | | | |
| | PSt | 15 | | | | | | |
| 6 | MBS | 80 | 278% | 96% | 0% | — | — | — |
| | PSt | 20 | | | | | | |

NOTE:
1. Stretching speed = 10 mm/min.
2. Dimension of sample sheet = 10mm (W) × 40mm (L) × 0.5mm (TH)
3. The numerical figures in the parentheses represent sustained elongation (%).

From Table 5 above, it will be understood that the photo-degrading property of the blended resin composition according to the present invention may be adjusted optionally by varying the blending quantity of polystyrene and polymethyl methacrylate to be blended with the MBS graft copolymer.

EXAMPLE 6

90 parts by weight of MBS graft copolymer with its graft portion being cross-linked as obtained in Example 1, and 10 parts by weight of polyvinyl chloride (PVC) were blended by the roll-kneader, and the blended resin composition was press-formed into a sheet of 250 microns thick at a temperature of 200°C. This filmy sheet was vacuum-molded into a cup-shaped container of 7 cm in the bottom inner diameter and 4 cm in depth.

The cup which had been exposed continuously for approximately 3 months outdoors (from August to November) was found to have been degraded and readily broken, while the same cup which had been kept indoors in a state of avoiding the sun light was found to have maintained its original shape, and its mechanical strength remained the same as it was at the time of the molding.

For the sake of comparison, the MBS graft copolymer having the cross-linked graft portion was singly kneaded by rolls and then press-formed into aa sheet of 250 microns. This filmy sheet was also subjected to the vacuum-molding for producing the same size of the cup-shaped container, but it was not successful in view of the film having been burst during the molding.

What we claim is:

1. A photodegradable resin composition which on exposure to light readily becomes brittle whereby it is easily broken by a slight shock applied thereto which consists essentially of:
   A. 50 to 99 parts by weight of a graft copolymer containing at least 30% by weight of butadiene as the monomeric unit thereof, said copolymer being composed of:
      1. 40 to 80 parts by weight of a homopolymer of butadiene, or a copolymer of butadiene and a monomer or a mixture of monomers copolymeriazble therewith with butadiene as the principal constituent, and
      2. 60 to 20 parts by weight of a monomeric mixture consisting of styrene and methyl methacrylate, and 0.01 to 5 parts by weight of a cross-linking agent copolymerizable with said monomers, said monomeric component (2) being graft-polymerized upon said butadiene polymer component (1); and
   B. 50 to 1 part by weight of a homopolymer of styrene, methyl methacrylate, acrylonitrile, vinyl chloride or vinylidene chloride, or a copolymer of said monomers as the principal constituent and other monomers copolymerizable therewith.

2. A photodegradable resin composition which on exposure to light readily becomes brittle whereby it is easily broken by a slight shock applied thereto which consists essentially of:
   A. 50 to 99 parts by weight of a graft copolymer containing at least 30% by weight of butadiene as the monomeric unit thereof, said copolymer being composed of:
      1. 40 to 80 parts by weight of a homopolymer of butadiene, or a copolymer of butadiene and a monomer or a mixture of monomers copolymerizable therewith with butadiene as the principal constituent, and
      2. 60 to 20 parts by weight of a monomeric mixture consisting of styrene and methyl metacrylate, and 0.01 to 5 parts by weight of a cross-linking agent copolymerizable with said monomers, said monomeric component (2) being graft-polymerized upon said butadiene polymer component (1); and
   B. 50 to 1 part by weight of a homopolymer of vinyl chloride or vinylidene chloride, or copolymers of said monomers as the principal constituent with other monomers copolymerizable therewith.

3. The resin composition according to claim 2, wherein said component (1) consists of 60 to 90% by weight of butadiene and 40 to 10% by weight of styrene.

4. The resin composition according to claim 2, wherein the butadiene content in said graft copolymer (A) ranges from 30 to 70% by weight in terms of the monomeric units thereof.

5. The resin composition according to claim 2, wherein the blending amount of said butadiene-containing graft copolymer (A) with the thermoplastic component (B) is at least 60 parts by weight.

6. The resin composition according to claim 2, wherein said monomer copolymerizable with butadiene to constitute the copolymer (1) is selected from the group consisting of isoprene, chloroprene, styrene, alpha-methyl styrene, acrylonitrile, methacrylonitrile, methyl acrylate, methyl methacrylate, ethyl acrylate, divinyl benzene, mono-ethylene glycol dimethacrylate, polyethylene glycol dimethacrylate, and polypropylene glycol dimethacrylate.

7. The resin composition according to claim 2, wherein the monomer copolymerizable with the vinyl chloride or vinylidene chloride as the principal constituent in the polymer component (B) is selected from the group consisting of styrene, alpha-methyl styrene, butadiene, acrylonitrile, ethyl acrylate, methyl acrylate, methyl methacrylate, vinyl acetate, vinylidene chloride, ethylene, vinyl ketones, and vinyl ethers.

8. A photodegradable resin composition which on exposure to light readily becomes brittle whereby it is easily broken by a slight shock applied thereto which consists essentially of:
   A. 50 to 99 parts by weight of a graft copolymer containing at least 30% by weight of butadiene as the monomeric unit thereof, said copolymer being composed of:
      1. 40 to 80 parts by weight of a homopolymer of butadiene, or a copolymer of butadiene and a monomer or a mixture of monomers copolymerizable therewith with butadiene as the principal constituent, and
      2. 60 to 20 parts by weight of a monomeric mixture consisting of styrene and methyl methacrylate, and 0.01 to 5 parts by weight of a cross-linking agent copolymerizable with said monomers, said monomeric component (2) being graft-polymerized upon said butadiene polymer component (1) in two or more divided stages; and
   B. 50 to 1 part by weight of a homopolymer of vinyl chloride and vinylidene chloride, or copolymers of said monomers as the principal component with other monomers copolymerizable therewith.

* * * * *